UNITED STATES PATENT OFFICE.

ANASTASIUS KRYZINSKI, OF CHICAGO, ILLINOIS, ASSIGNOR OF ONE-HALF OF HIS RIGHT TO JACOB OSIK, OF SAME PLACE.

COMPOSITION FOR COVERING MOLDINGS.

SPECIFICATION forming part of Letters Patent No. 223,593, dated January 13, 1880.

Application filed December 13, 1879.

*To all whom it may concern:*

Be it known that I, ANASTASIUS KRYZINSKI, of Chicago, in the county of Cook and State of Illinois, have invented a certain new and useful Improvement in Compositions for Covering Moldings, of which the following is a specification.

The object I have in view is to produce a composition or paste for covering moldings previous to their being gilded, colored, or grained, and burnished, which will be less expensive and more tough and elastic than the composition heretofore used for this purpose, will not crack so easily, can be burnished quicker and better, and will not require heating so often to keep it in a plastic condition; and my invention consists in a molding composition composed of glue, hot water, rye-flour, and whiting, in the proportions hereinafter set forth.

To make my molding composition, I take four (4) pounds of glue and dissolve the same in ten (10) gallons of hot water. I then add to this and mix with the same eight (8) pounds of rye-flour, and then mix the same with one hundred and ninety (190) pounds of whiting.

The molding is covered with this composition on its ornamented surface, in accordance with the shape desired to be given to the face of the molding, and the composition is allowed to set and become hard. The molding is then finished in the usual manner.

The composition heretofore used is made by mixing two hundred and eighty (280) pounds of whiting with ten (10) pounds of glue previously dissolved in ten (10) gallons of water; but this composition is much more expensive, and is not so tough or elastic as mine is, cracks more easily, cannot be burnished so readily or perfectly, and requires frequent heating to retain it in a plastic state while being applied.

Having thus fully described my invention, what I claim is—

The composition described for covering moldings, consisting of glue, water, rye-flour, and whiting, as set forth.

ANASTASIUS KRYZINSKI.

Witnesses:
R. N. DYER,
JACOB OSIK.